(12) United States Patent
Hirono

(10) Patent No.: US 9,035,581 B2
(45) Date of Patent: May 19, 2015

(54) MOTOR CONTROL DEVICE

(75) Inventor: Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 23 days.

(21) Appl. No.: 13/985,864

(22) PCT Filed: Feb. 8, 2012

(86) PCT No.: PCT/JP2012/052849
§ 371 (c)(1),
(2), (4) Date: Aug. 15, 2013

(87) PCT Pub. No.: WO2012/111506
PCT Pub. Date: Aug. 23, 2012

(65) Prior Publication Data
US 2013/0320897 A1    Dec. 5, 2013

(30) Foreign Application Priority Data

Feb. 15, 2011 (JP) ................................. 2011-029815

(51) Int. Cl.
*H02P 21/00* (2006.01)
*H02P 6/18* (2006.01)
*H02P 21/14* (2006.01)

(52) U.S. Cl.
CPC ............ *H02P 6/182* (2013.01); *H02P 21/0042* (2013.01); *H02P 21/146* (2013.01)

(58) Field of Classification Search
USPC ........ 318/400.02, 727, 800, 802, 400.32, 432
See application file for complete search history.

(56) References Cited

U.S. PATENT DOCUMENTS

| 5,329,217 | A * | 7/1994 | Kerkman et al. ............. 318/811 |
| 5,903,128 | A * | 5/1999 | Sakakibara et al. .......... 318/721 |
| 6,069,467 | A * | 5/2000 | Jansen ........................... 318/802 |
| 6,940,250 | B2 * | 9/2005 | Nishimura et al. ........... 318/705 |
| 7,378,749 | B2 * | 5/2008 | Moore ............................... 290/2 |
| 7,728,537 | B2 * | 6/2010 | Tomigashi ............... 318/400.02 |
| 2009/0058334 | A1 * | 3/2009 | Yamamoto ............... 318/400.02 |
| 2009/0237015 | A1 * | 9/2009 | Hashimoto et al. ...... 318/400.02 |
| 2010/0308757 | A1 * | 12/2010 | Ide et al. .................. 318/400.02 |

FOREIGN PATENT DOCUMENTS

| JP | 2001-161090 | 6/2001 |
| JP | 2004-297901 | 10/2004 |
| JP | 2009-95135 | 4/2009 |
| JP | 2009-278828 | 11/2009 |
| JP | 2011-4515 | 1/2011 |

* cited by examiner

*Primary Examiner* — Rina Duda
(74) *Attorney, Agent, or Firm* — Cozon O'Connor

(57) ABSTRACT

A motor control device that can improve stability of sensorless control of a permanent magnetic synchronous motor. Rotor position detection (10) includes motor parameter correction (30) for correcting a parameter (winding resistance of a coil, a magnetic flux amount of a permanent magnet), which is a machine constant of a motor, in order to eliminate an induced voltage difference between a detected induced voltage peak value and a detected estimated induced voltage peak value. The rotor position is detected on the basis of the corrected parameter.

7 Claims, 11 Drawing Sheets

MOTOR CONTROL DEVICE

RELATED APPLICATIONS

This is a U.S. national stage of International application No. PCT/JP2012/052849 filed on Feb. 8, 2012.

This application claims the priority of Japanese application no. 2011-029815 filed Feb. 15, 2011, the entire content of which is hereby incorporated by reference.

TECHNICAL FIELD

The present invention relates to a motor control device, and more particularly, to a motor control device that variably controls the speed of a permanent magnetic synchronous motor through sensorless control.

BACKGROUND ART

As a motor having high efficiency and a wide variable speed range, a permanent magnetic synchronous motor (PMSM), in particular, an interior permanent magnetic synchronous motor (IPMSM) in which a permanent magnet is embedded in a rotor has found extensive applications such as a compressor driving motor of an air conditioner for vehicle and a drive motor for electric automobile. Demand for the motor is expected.

A motor control device that controls driving of the motor of this type is composed of a motor, an inverter, a direct-current power supply, and a controller incorporating a microcomputer.

In the operation of the motor, in general, the controller detects an electric current flowing through a coil wound around a stator (armature) of the motor and causes the electric current to follow a target current phase through current feedback control. In the current feedback control, the controller decomposes the target current phase into a d-axis current Id, which is a d-axis component parallel to a magnetic field, and a q-axis current Iq, which is a q-axis component orthogonal to the magnetic field, and sets, as the target current phase, a current vector composed from the d-axis current Id and the q-axis current Iq on a d-q-axis coordinate, and controls the current vector. Consequently, it is possible to highly efficiently operate the motor at optimum torque.

In the motor, it is a common practice to use so-called sensorless control, which includes detecting an induced voltage of the motor from, for example, information concerning an electric current and a voltage detected by a controller and effectively detecting a rotor position to control the motor without using a physical sensor. Actual d and q axes are not directly known during the sensorless control. Therefore, the controller sets imaginary axes respectively for the original d and q axes and executes the current vector control on the imaginary axes.

However, it is known that, since the imaginary axis is only an axis assumed in the controller, an angle error of $\Delta\theta$ is present between actual d and q axes and, in order to efficiently stably operate the motor, it is necessary to quickly and accurately converge this $\Delta\theta$ to zero.

For example, Patent Literature 1 discloses the following simplified axial position error estimation expression for estimating an angle error $\Delta\theta c$ of an axial position:

[Expression 1]

$$\Delta\theta c \approx \tan^{-1}\left(\frac{Vd^{**} - R^* \cdot Idc + \omega_1^* - Lq^* \cdot Iqc}{Vq^{**} - R^* \cdot Iqc - \omega_1^* \cdot Lq^* \cdot Idc - (R - R^*) \cdot Idc}\right)$$

$$= \tan^{-1}\left(\frac{Vd^{**} - R^* \cdot Idc + \omega_1^* \cdot Lq^* \cdot Iqc}{Vq^{**} - R \cdot Iqc - \omega_1^* \cdot Lq^* \cdot Idc}\right)$$

In the expression, $\Delta\theta c$: axial position estimation error (rotor position error, current phase error), Vdc: d-axis component of an applied voltage, Vqc: q-axis component of the applied voltage, Idc: d-axis current, Iqc: q-axis current, Lq: q-axis inductance, Ld: d-axis inductance, R: winding resistance of a coil, and $\omega 1$: frequency of the applied voltage. All of Vdc, Vqc, Idc, and Iqc are assumed values in the controller premised on the imaginary axes, all of Lq, Ld, and R are machine constants of the motor, and $\omega 1$ is a measured value. During the sensorless control, the controller performs control in order to converge $\Delta\theta c$ described above to zero.

The winding resistance R of the axial position error estimation expression of Expression 1 is the machine constant of the motor and is a parameter including an individual difference peculiar to the motor. Therefore, an error between a theoretical value and an actual value of the parameter greatly affects axial position estimation accuracy. Such an error of the parameter not only occurs from the individual difference of the motor but also fluctuates according to an environment to which the motor is exposed. In particular, since the coil is formed of a copper wire in general, actual winding resistance of the coil tends to fluctuate according to a temperature to which the motor is exposed and the parameter error also increases.

When the parameter error increases, the denominator term in the axial position error estimation expression may undesirably be zero or minus. In this case, an axial position cannot be estimated and a rotor position cannot be estimated either. Therefore, the motor may be operated while deviating from a stable operation limit for enabling the motor to be stably operated in the sensorless control and step-out may occur.

Therefore, in the related art, an error between a setting value R' set as a theoretical value of winding resistance and an actual value R of the winding resistance is corrected on the basis of a current phase detected in the d-q axis coordinate system.

CITATION LIST

Patent Literature

Patent Literature 1: Japanese Patent Laid-Open No. 2006-87152

SUMMARY OF INVENTION

Technical Problem

However, in the related art, a method of calculating only a correction amount of the winding resistance R, which is the motor parameter, on the basis of only the current phase is adopted, an actual value of the winding resistance R is not estimated, and the calculation is performed based on only the current phase. Therefore, a correction calculation may be complicated and a response delay may occur in the sensorless control to hinder stability of control.

The present invention has been devised in view of such problems and it is an object of the present invention to provide a motor control device that can improve stability of the sensorless control of the permanent magnetic synchronous motor.

Solution to Problem

In order to attain the object, a motor control device according to the present invention is a motor control device that detects a rotor position of a permanent magnetic synchronous motor through sensorless control, the motor control device including: current detecting means for detecting an electric current flowing through a coil of the motor; applied voltage detecting means for detecting a voltage applied to the coil of the motor; rotor position detecting means for detecting a current phase and a current peak value, and an induced voltage phase and an induced voltage peak value on the basis of the electric current detected by the current detecting means and the voltage detected by the applied voltage detecting means, and detecting the rotor position and detecting an estimated induced voltage peak value on the basis of the detected current phase and the detected current peak value, and the detected induced voltage phase, and a parameter, which is a machine constant of the motor; revolution number detecting means for detecting the number of revolutions of the motor on the basis of the rotor position detected by the rotor position detecting means; and phase voltage setting means for setting a target voltage on the basis of the electric current detected by the current detecting means and the rotor position detected by the rotor position detecting means. The rotor position detecting means includes motor parameter correcting means for correcting the parameter in order to eliminate an induced voltage difference between the detected induced voltage peak value and the detected estimated induced voltage peak value and detects the rotor position on the basis of the corrected parameter.

More specifically, the parameter is winding resistance of the coil and a magnetic flux amount of a permanent magnet of the motor.

Preferably, the motor parameter correcting means corrects the parameter according to an operation state of the motor.

The motor parameter correcting means corrects the parameter on the basis of the current phase detected by the rotor position detecting means and the number of revolutions detected by the revolution number detecting means as an operation state of the motor.

Further, the motor parameter correcting means changes an operation state of the motor to determine a correction amount of the parameter.

Preferably, the motor control device includes abnormality detecting means for determining that the motor is abnormal and detecting the abnormality when the induced voltage difference deviates exceeding a predetermined range even when the parameter is corrected by the motor parameter correcting means.

Advantageous Effects of Invention

According to an embodiment of the motor control device, the rotor position detecting means includes the motor parameter correcting means for correcting the parameter in order to eliminate an induced voltage difference between the detected induced voltage peak value and the detected estimated induced voltage peak value and detects the rotor position on the basis of the corrected parameter. Consequently, it is possible to eliminate an error between a theoretical value and an actual value of the motor parameter and avoid a sensorless uncontrollable state involved in occurrence of the error. Therefore, it is possible to improve stability of the sensorless control for the permanent magnetic synchronous motor.

According to an embodiment of the invention, the parameter to be corrected is winding resistance of the coil and a magnetic flux amount of the permanent magnet. These parameters tend to be affected by a temperature change to which the motor is exposed and an error of the parameters also tends to be large. Therefore, it is possible to effectively improve stability of the sensorless control through elimination of the error.

According to an embodiment of the invention, the motor parameter correcting means corrects the parameter according to an operation state of the motor. Therefore, it is possible to change a correction amount of the parameter that changes according to the operation state of the motor. Consequently, it is possible to further improve accuracy of the sensorless control and further improve stability of the sensorless control.

According to an embodiment of the invention, more specifically, the motor parameter correcting means corrects the parameter on the basis of the current phase detected by the rotor position detecting means and the number of revolutions detected by the revolution number detecting means as an operation state of the motor.

According to an embodiment of the invention, the motor parameter correcting means changes an operation state of the motor to determine a correction amount of the parameter. Therefore, it is possible to spontaneously perform the correction of the motor parameter. Consequently, it is possible to further improve accuracy of the sensorless control and further improve stability of the sensorless control.

According to an embodiment of the invention, the motor control device includes abnormality detecting means for determining that the motor is abnormal and detecting the abnormality when the induced voltage difference deviates exceeding a predetermined range even when the parameter is corrected by the motor parameter correcting means. Therefore, it is possible to quickly detect, as an abnormality of the motor, inability to eliminate the induced voltage difference even with the motor parameter correcting means, stop an output of the motor, and improve reliability of the sensorless control of the motor.

DESCRIPTION OF EMBODIMENTS

Figure 1:
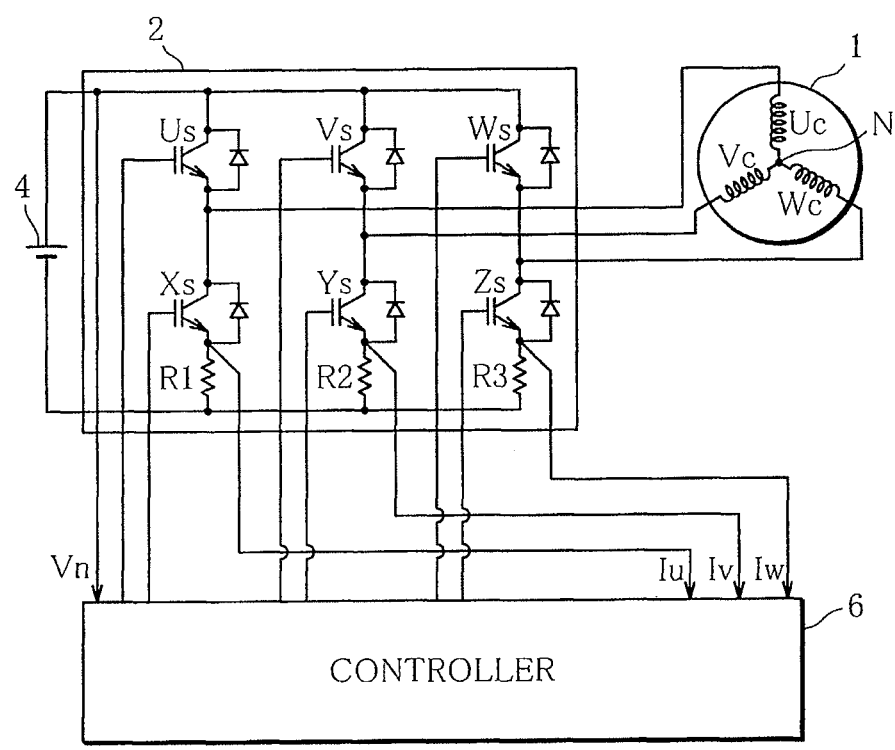
FIG. 1 is a configuration diagram of a motor control device according to a first embodiment of the present invention.

FIG. 1 is a configuration diagram of a motor control device according to a first embodiment of the present invention. The motor control device is configured from a motor 1, an inverter 2, a direct-current power supply 4, and a controller 6 incorporating a microcomputer.

Figure 2:
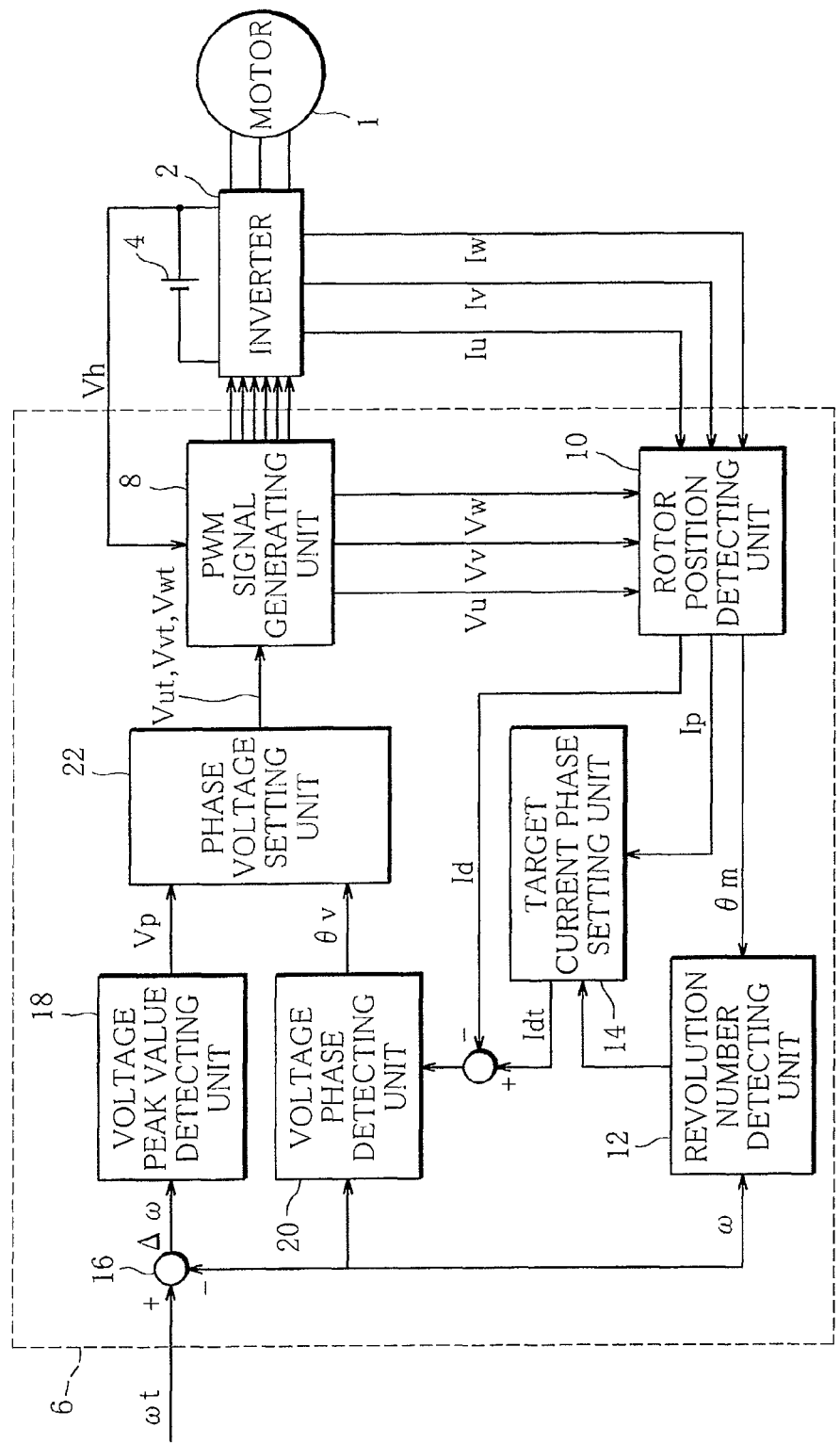
FIG. 2 is a control block diagram showing sensorless control for a rotor position of a motor performed by a controller shown in FIG. 1.

FIG. 2 is a control block diagram showing sensorless control of the motor 1 performed by the controller 6. The controller 6 includes a PWM signal generating unit 8, a rotor position detecting unit (rotor position detecting means) 10, a revolution number detecting unit (revolution number detecting means) 12, a target current phase setting unit (current phase setting means) 14, an adder 16, a voltage peak value detecting unit 18, a voltage phase detecting unit 20, and a phase voltage setting unit (phase voltage setting means) 22.

The motor 1 is a three-phase blushless DC motor. The motor 1 includes a not-shown stator including coils of three phases (a U-phase coil Uc, a V-phase coil Vc, and a W-phase coil Wc) and a not-shown rotor including a permanent magnet. The U-phase coil Uc, the V-phase coil Vc, and the W-phase coil Wc are connected in a star shape centering on a neutral point N as shown in FIG. 1 or connected in a delta shape.

The inverter 2 is a three-phase bipolar driving type inverter. The inverter 2 includes switching elements of three phases corresponding to the coils of the three phases of the motor 1, specifically, six switching elements (upper-phase switching elements Us, Vs, and Ws and lower-phase switching elements Xs, Ys, and Zs) consisting of IGBT or the like and shunt resistors R1, R2, and R3.

The upper-phase switching element Us, the lower-phase switching element Xs, the shunt resistor R1, the upper-phase switching element Vs, the lower-phase switching element Ys, the shunt resistor R2, the upper-phase switching element Ws, the lower-phase switching element Zs, and the shunt resistor R3 are connected in series to one another. Output terminals of the direct-current power supply 4, which generates a high voltage Vh, are connected in parallel to both ends of respective series connection lines for these devices.

An emitter side of the upper-phase switching element Us is connected to the U-phase coil Uc of the motor 1. An emitter side of the upper-phase switching element Vs is connected to the V-phase coil Vc of the motor 1. An emitter side of the upper-phase switching element Ws is connected to the V-phase coil Wc of the motor 1.

Further, gates of the upper-phase switching elements Us, Vs, and Ws, gates of the lower-phase switching elements Xs, Ys, and Zs, and a secondary side output terminal of the direct-current power supply 4 are respectively connected to the PWM signal generating unit 8. Further, the lower-phase switching element Xs side of the shunt resistor R1, the lower-phase switching element Ys side of the shunt resistor R2, and the lower-phase switching element Zs side of the shunt resistor R3 are respectively connected to the rotor position detecting unit 10.

The inverter 2 detects, using voltages respectively detected by the shunt resistors R1, R2, and R3, electric currents (a U-phase current Iu, a V-phase current Iv, and a W-phase current Iw) flowing through the U-phase coil Uc, the V-phase coil Vc, and the W-phase coil Wc of the motor 1 (current detecting means) and sends the electric currents to the rotor position detecting unit 10.

The PWM signal generating unit 8 detects a high voltage Vh of the direct-current power supply 4, generates, on the basis of the high voltage Vh and a phase voltage set by the phase-voltage setting unit 22, a PWM signal for turning on and off the respective switching elements in the gates of the upper-phase switching elements Us, Vs, and Ws and the gates of the lower-phase switching elements Xs, Ys, and Zs of the inverter 2, and sends the PWM signal to the inverter 2.

The upper-phase switching elements Us, Vs, and Ws and the lower-phase switching elements Xs, Ys, and Zs of the inverter 2 are turned on and off in a predetermined pattern according to the PWM signal from the PWM signal generating unit 8 and apply sine wave energization (180 degree energization) based on this ON/OFF pattern to the U-phase coil Uc, the V-phase coil Vc, and the W-phase coil Wc of the motor 1.

The PWM signal generating unit 8 is connected to the rotor position detecting unit 10. The PWM signal generating unit 8 detects, using the high voltage Vh of the direct-current power supply 4 detected by the PWM signal generating unit 8, voltages (a U-phase applied voltage Vu, a V-phase applied voltage Vv, and a W-phase applied voltage Vw) applied to the U-phase coil Uc, the V-phase coil Vc, and the W-phase coil Wc of the motor 1 (applied voltage detecting means) and sends the voltages to the rotor position detecting unit 10.

Figure 3:
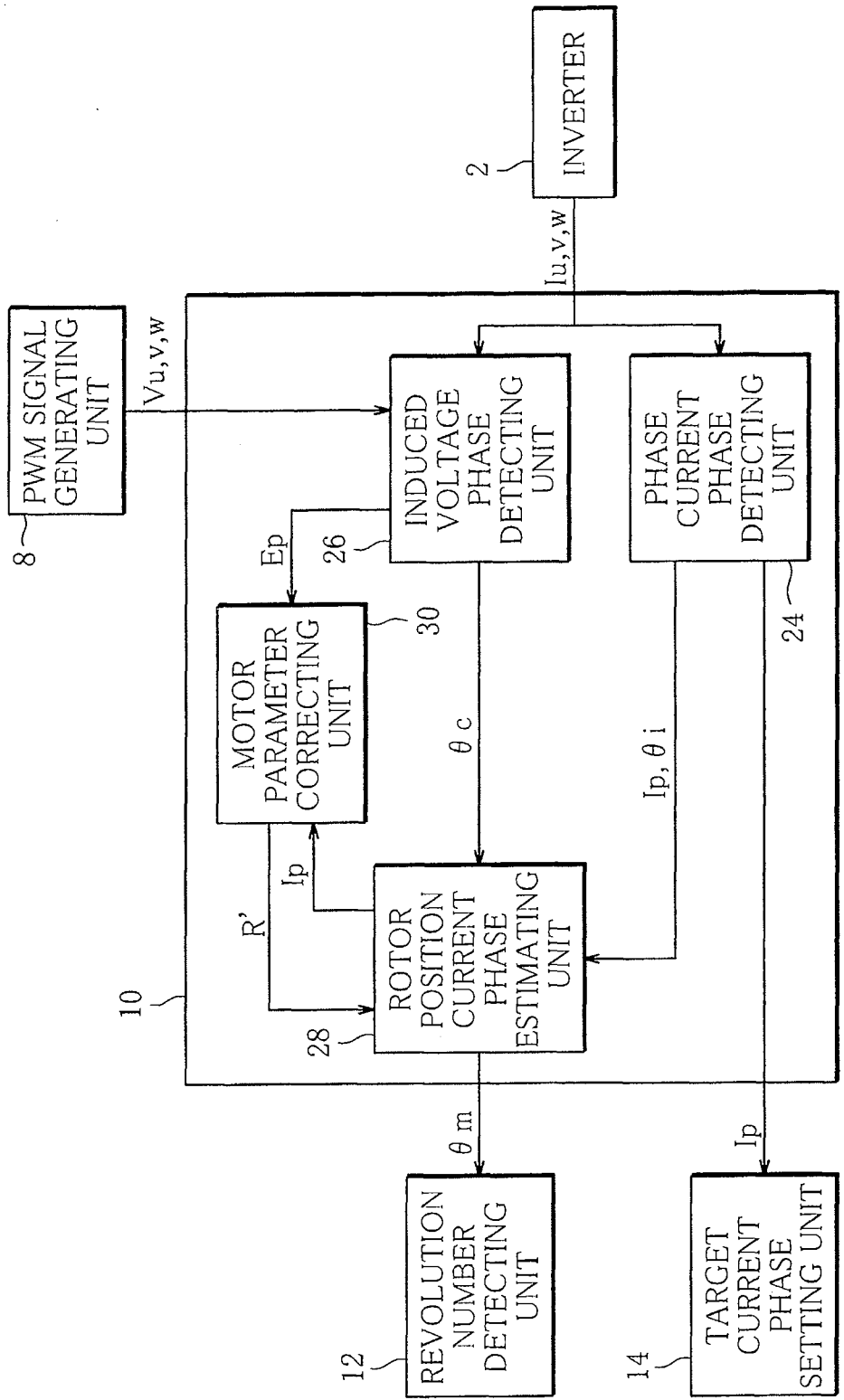
FIG. 3 is a control block diagram showing details of a rotor position detecting unit shown in FIG. 2.

FIG. 3 is a control block diagram showing the rotor position detecting unit 10 in detail. The rotor position detecting unit 10 includes a phase current phase detecting unit 24, an induced voltage phase detecting unit 26, a rotor position/current phase estimating unit 28, a motor parameter correcting unit (motor parameter correcting means) 30.

The phase current phase detecting unit 24 detects a phase current peak value Ip (a current phase) and a phase current electric angle θi (a current phase) using the U-phase current Iu, the V-phase current Iv, and the W-phase current Iw sent from the inverter 2 and sends the phase current peak value Ip and the phase current electric angle θi to the rotor position/current phase estimating unit 28. The phase current phase detecting unit 24 sends the detected phase current peak value Ip to the target current phase setting unit 14.

Figure 4:
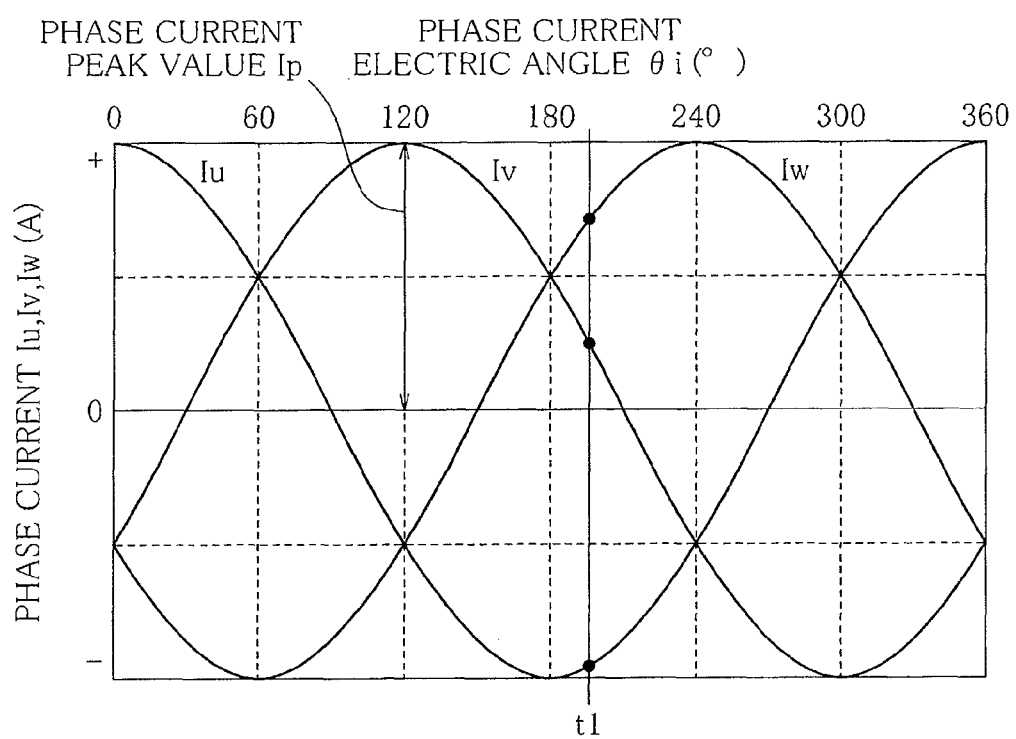
FIG. 4 is a phase current waveform chart at the time when sine wave energization (180° energization) is applied to a U-phase coil Uc, a V-phase coil Vc, and a W-phase coil Wc of the motor shown in FIG. 2.

Specifically, referring to a phase current waveform chart of FIG. 4 at the time when sine wave energization (180° energization) is applied to the U-phase coil Uc, the V-phase coil Vc, and the W-phase coil Wc of the motor 1, the U-phase current Iu, the V-phase current Iv, and the W-phase current Iw forming a sine waveform respectively have a phase difference of 120°.

From the phase current waveform chart, the following expressions hold between the U-phase current Iu, the V-phase current Iv, and the W-phase current Iw and the phase current peak value Ip and the phase current electric angle θi:

$$Iu = Ip \times \cos(\theta i)$$

$$Iv = Ip \times \cos(\theta i - 2/3\pi)$$

$$Iw = Ip \times \cos(\theta i + 2/3\pi)$$

The detection of the phase current peak value Ip and the phase current electric angle θi in the phase current phase detecting unit 24 is performed on the premise that the expressions hold. The phase current peak value Ip and the phase current electric angle θi are calculated by a calculation of the expressions using the U-phase current Iu, the V-phase current Iv, and the W-phase current Iw sent from the inverter 2.

The induced voltage phase detecting unit 26 detects an induced voltage peak value Ep and an induced voltage electric angle θe (an induced voltage phase) as actual values using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8 and sends the induced voltage peak value Ep and the induced voltage electric angle θe to the rotor position/current phase estimating unit 28. The induced voltage phase detecting unit 26 sends the detected induced voltage peak value Ep to the motor parameter correcting unit 30.

Figure 5:
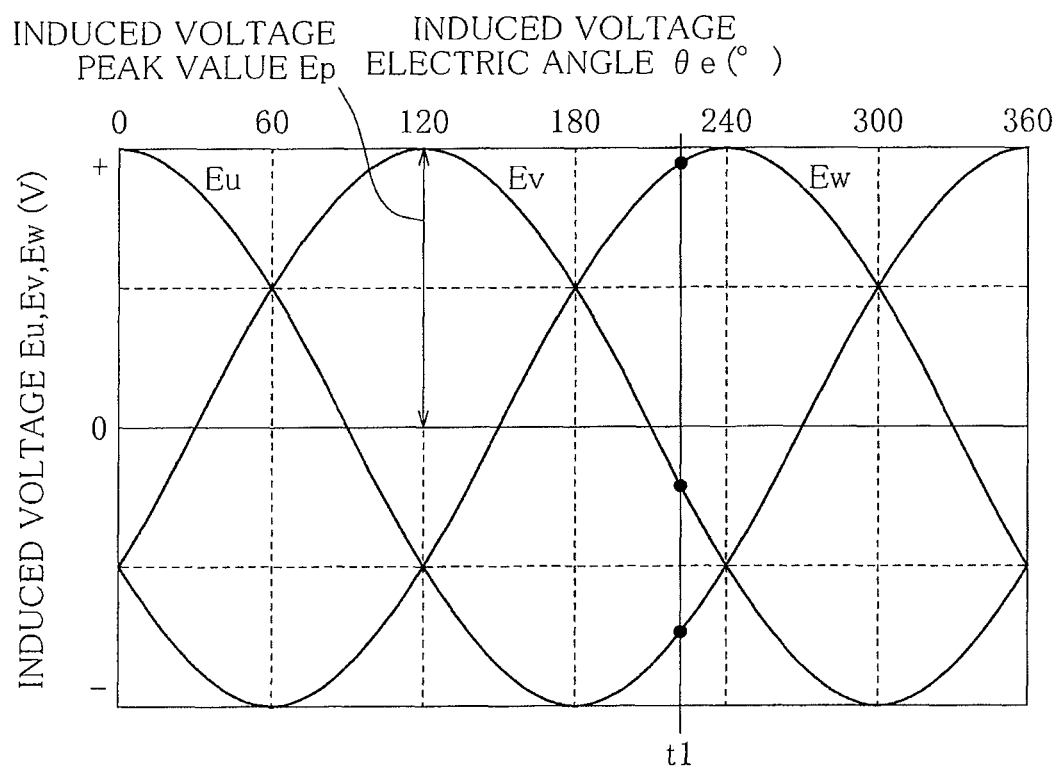
FIG. 5 is an induced voltage waveform chart at the time when the sine wave energization (180° energization) is applied to the U-phase coil Uc, the V-phase coil Vc, and the W-phase coil Wc of the motor shown in FIG. 2.

Specifically, referring to the induced voltage waveform chart of FIG. 5 at the time when sine wave energization (180° energization) is applied to the U-phase coil Uc, the V-phase coil Vc, and the W-phase coil Wc of the motor 1, a U-phase induced voltage Eu, a V-phase induced voltage Ev, a the W-phase induced voltage Ew forming a sine waveform respectively have a phase difference of 120°.

From the induced voltage waveform chart, the following expressions hold between the U-phase induced voltage Eu, the V-phase induced voltage Ev, and the W-phase induced voltage Ew and the induced voltage peak value Ep and the induced voltage electric angle θe:

$$Eu = Ep \times \cos(\theta e)$$

$$Ev = Ep \times \cos(\theta e - 2/3\pi)$$

$$Ew = Ep \times \cos(\theta e + 2/3\pi)$$

The following expressions hold among the U-phase applied voltage Vu, the V-phase applied voltage Vv, and the W-phase applied voltage Vw, the U-phase current Iu, the V-phase current Iv, and the W-phase current Iw, U-phase coil resistance Ru, V-phase coil resistance Rv, and W-phase coil resistance Rw, and the U-phase induced voltage Eu, the V-phase induced voltage Ev, and the W-phase induced voltage Ew:

$$Vu - Iu \times Ru = Eu$$

$$Vv - Iv \times Rv = Ev$$

$$Vw - Iw \times Rw = Ew$$

The detection of the induced voltage peak value Ep and the induced voltage electric angle θe in the induced voltage phase detecting unit 26 is performed on the premise that the expressions hold. The U-phase induced voltage Eu, the V-phase induced voltage Ev, and the W-phase induced voltage Ew are calculated from the expression (the latter expression) using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8. The induced voltage peak value Ep and the induced voltage electric angle θe are calculated from the expression (the former expression) using the calculated U-phase induced voltage Eu, V-phase induced voltage Ev, and W-phase induced voltage Ew.

The rotor position/current phase estimating unit 28 detects a rotor position θm from the following expression using the phase current electric angle θi detected here and a current phase β selected from a data table explained below prepared in advance:

$$\theta m = \theta i - \beta - 90°$$

Sensorless control not by a physical sensor is performed in the rotor position detecting unit 10. Note that, as explained above, an angle error Δθ of an axial position is present in the rotor position θm detected by the sensorless control.

The data table used here defines the current phase β using [phase current peak value Ip] and [induced voltage electric angle θe−phase current electric angle θi] as parameters. The expected current phase β p can be selected using [phase current peak value Ip] and [induced voltage electric angle θe−phase current electric angle θi] as parameters. Note that the phase current peak value Ip detected by the rotor position detecting unit 10 corresponds to [phase current peak value Ip]. A value obtained by subtracting the phase current electric angle θi from the induced voltage electric angle θe detected by the rotor position detecting unit 10 corresponds to [induced voltage electric angle θe−phase current electric angle θi].

Figure 6:
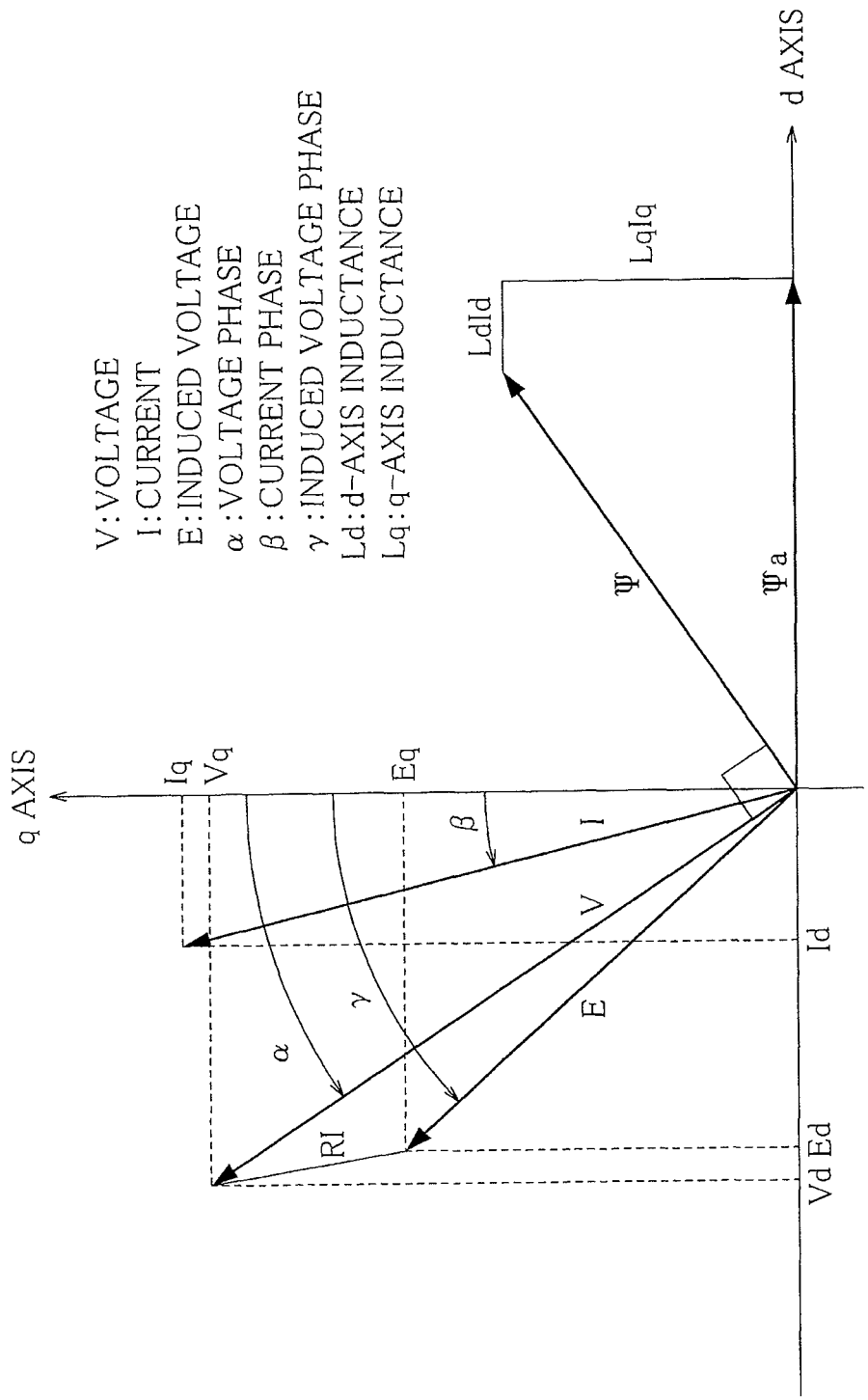
FIG. 6 is a motor vector diagram at the time when a rotor of the motor shown in FIG. 2 is rotating.

FIG. 6 is a motor vector diagram at the time when the rotor of the motor 1 is rotating. A relation among a voltage V, an electric current I, and an induced voltage E is represented as vectors on the d-q-axis coordinate. In the figure, Vd represents a d-axis component of the voltage V, Vq represents a q-axis component of the voltage V, Id represents a d-axis component (a d-axis current) of the electric current I, Iq represents a q-axis component (a q-axis current) of the electric current I, Ed represents a d-axis component of the induced voltage E, Eq represents a q-axis component of the induced voltage E, α represents a voltage phase based on the q axis, β represents a current phase based on the q axis, and γ represents an induced voltage phase based on the q axis. In the figure, Ψa represents a magnetic flux of a permanent magnet of the rotor, Ld represents d-axis inductance, Lq represents q-axis inductance, R represents winding resistance of the stator, and Ψ represents a total flux linkage of the rotor.

From the motor vector diagram, when the number of revolutions of the rotor is represented as ω, the following expression holds:

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \quad \text{[Expression 2]}$$

When a value concerning ω is transferred from the right side to the left side of the expression, the following expression holds:

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{[Expression 3]}$$

The generation of the data table used in detecting the rotor position θm in the rotor position/current phase estimating unit 28 is performed on the premise that the expressions hold under the motor vector diagram. The current phase β at the time when [induced voltage phase γ−current phase β] is a predetermined value is stored while the current phase β and the electric current I shown in the motor vector diagram are respectively increased stepwise in predetermined ranges. The data table of the current phase β including [phase current peak value Ip] equivalent to [electric current I] and [induced voltage electric angle θe−phase current electric angle θi] equivalent to [induced voltage phase γ−current phase β] as parameters is generated. The rotor position θm detected by the rotor position/current phase estimating unit 28 using the generated data table is sent to the revolution number detecting unit 12. The phase current peak value Ip used here is sent to the motor parameter correcting unit 30.

The motor parameter correcting unit 30 detects, using the motor parameters (Ψ, Ld, Lq, R, and ω), which are machine constants peculiar to the motor, an estimated induced voltage peak value Ep' from the motor vector chart shown in FIG. 6 and the data table generated on the premise that Expressions 2 and 3 hold. The motor parameter correcting unit 30 detects an induced voltage peak value difference ΔEp between an induced voltage peak value EP, which is so to speak an actual value, calculated using the U-phase induced voltage Eu, the V-phase induced voltage Ev, and the W-phase induced voltage Ew sent from the induced voltage phase detecting unit 26 and the estimated induced voltage peak value Ep'. The motor parameter correcting unit 30 calculates a correction amount ΔR of the winding resistance R according to the following expressions using the phase−current peak value Ip sent from the rotor position/current phase estimating unit 28.

$$Ep = R \cdot Ip$$

$$Ep' = R' \cdot Ip$$

When a difference between the expressions is calculated, the following expression holds:

$$Ep - Ep' = (R - R') \cdot Ip$$

When E−Ep'=ΔEp and R−R'=ΔR are substituted in this expression, the following expression holds:

$$\Delta R = \Delta Ep / Ip$$

When a corrected winding resistance R' is calculated by filtering a correction amount ΔR detected by this expression through a predetermined low-pass filter LPF to remove noise thereof and adding the correction amount ΔR to the winding resistance R, which is a theoretical value, the following expression holds:

$$R' = R + LPF(\Delta R)$$

The calculated corrected winding resistance R' is sent to the rotor position/current phase estimating unit 28. In the rotor position/current phase estimating unit 28, the corrected winding resistance R' is used instead of the theoretical winding resistance R in the data table based on Expressions 2 and 3 and used for detection of the rotor position θm.

The revolution number detecting unit 12 calculates a rotor position change amount Δθm using the rotor position θm, which is detected by the rotor position detecting unit 10, by subtracting a rotor position θm−1, a calculation cycle of which is one cycle before a calculation cycle of the rotor position θm, from the rotor position θm. The revolution number detecting unit 12 applies a predetermined filter to the rotor position change amount Δθm to detect the number of revolutions ω of the motor 1 and sends the number of revolutions ω to the adder 16. The revolution number detecting unit 12 feeds back the number of revolutions ω calculated by the revolution number detecting unit 12 to a target number of revolutions ωt of the motor 1, which is instructed to the controller 6, through the adder 16, calculates a revolution number difference Δω according to processing such as P control or PI control, and sends the revolution number difference Δω to the voltage peak value detecting unit 18.

The voltage peak value detecting unit 18 detects an applied voltage peak value Vp of a voltage applied to the motor 1 using the calculated revolution number difference Δω according to the processing such as the P control or the PI control and sends the applied voltage peak value Vp to the phase voltage setting unit 22.

The target current phase setting unit 14 sets a target current phase to maximize generation torque of the motor 1 with respect to a phase current according to, for example, current vector control called maximum torque/current control. Specifically, the target current phase setting unit 14 sets a target d-axis current Idt using the phase current peak value Ip detected by the rotor position detecting unit 10 and the data table prepared in advance and sends the target d-axis current Idt to the voltage phase detecting unit 20.

The voltage phase detecting unit 20 detects an applied voltage phase θv (a target voltage phase) of a voltage applied to the motor 1 using the target d-axis current Idt set by the target current phase setting unit 14 and sends the applied voltage phase θv to the phase voltage setting unit 22.

The phase voltage setting unit 22 sets applied setting voltages (a U-phase applied setting voltage Vut, a V-phase applied setting voltage Vvt, and a W-phase applied setting voltage Vwt) to be applied to the U-phase coil Uc, the V-phase coil Vc, and the W-phase coil Wc of the motor 1 using the applied voltage peak value Vp detected by the voltage peak value detecting unit 18 and the applied voltage phase θv detected by the voltage phase detecting unit 20 and sends the applied setting voltages to the PWM signal generating unit 8.

the PWM signal generating unit 8 performs sine wave energization (180 degree energization) of the applied setting voltages set by the phase voltage setting unit 22 for the U-phase coil Uc, the V-phase coil Vc, and the W-phase coil Wc of the motor 1 via the inverter 2 on the basis of an ON/OFF pattern of a PWM signal. Consequently, the motor 1 is operated at a desired number of revolutions.

As explained above, in this embodiment, the motor control device includes the motor parameter correcting unit configured to correct the motor parameter on the basis of an induced voltage phase in order to eliminate an error between a theoretical value and an actual value of the motor parameter. The rotor position detecting unit detects a rotor position on the basis of the motor parameter corrected by the motor parameter correcting unit. Consequently, it is possible to eliminate the error between the theoretical value and the actual value of the motor parameter and avoid a sensorless uncontrollable state involved in occurrence of the error. Therefore, it is possible to improve stability of the sensorless control of the permanent magnetic synchronous motor.

The motor parameter to be corrected is the winding resistance R of the coil. Consequently, since the coil is formed of a copper wire in general, the winding resistance R tends to be affected by a temperature change to which the motor 1 is exposed, and an error of the winding resistance R also tends to be large, it is possible to effectively improve stability of the sensorless control through elimination of the error.

Next, a second embodiment of the present invention is explained.

Figure 7:
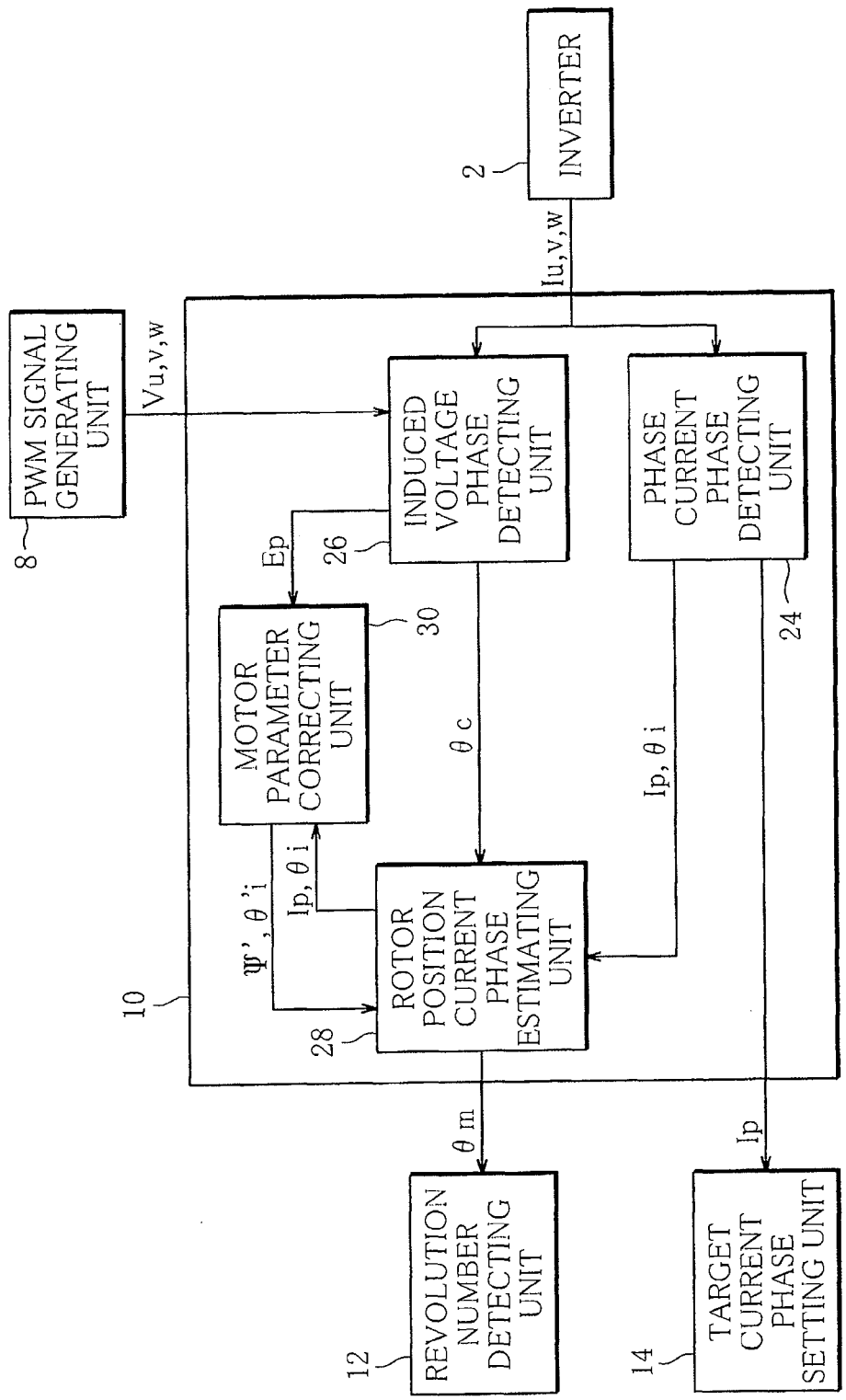
FIG. 7 is a control block diagram showing details of a rotor position detecting unit according to a second embodiment of the present invention.

FIG. 7 is a control block diagram showing the rotor position detecting unit 10 according to this embodiment in detail. Note that, for example, a basic configuration of a motor control device and a basic control method for the motor 1 such as sensorless control are the same as those in the case of the first embodiment. Therefore, explanation thereof is omitted.

As in the case of the first embodiment, the motor parameter correcting unit 30 in this embodiment detects, using the motor parameters (Ψ, Ld, Lq, R, and ω), which are machine constants peculiar to the motor, the estimated induced voltage peak value Ep' from the motor vector chart shown in FIG. 6 and the data table generated on the premise that Expressions 2 and 3 hold. The motor parameter correcting unit 30 calculates a correction amount $\Delta\Psi$ of a permanent magnet magnetic flux amount $\Psi$ according to the following expressions using the induced voltage peak value Ep, which is an actual value, sent from the induced voltage phase detecting unit 26 and the phase current peak value Ip sent from the rotor position/current phase estimating unit 28:

$$Ep=\omega\cdot\Psi$$

$$Ep'=\omega\cdot\Psi'$$

In these expressions, $\Psi$ represents a theoretical value and $\Psi'$ represents an actual value after correction. When a difference between the expressions is calculated, the following expression holds:

$$Ep-Ep'=\omega\cdot(\Psi-\Psi')$$

When $Ep-Ep'=\Delta Ep$ and $\Psi-\Psi'=\Delta\Psi$ are substituted in this expression, the following expression holds:

$$\Delta\Psi=\Delta Ep/\omega$$

A corrected magnetic flux amount $\Psi'$ is calculated by filtering the correction amount $\Delta\Psi$ calculated by this expression through a predetermined low-pass filter LPF to remove noise thereof and adding the correction amount $\Delta\Psi$ to the magnetic flux amount $\Psi$, which is a theoretical value.

$$\Psi'=\Psi+LPF(\Delta\Psi)$$

The corrected magnetic flux amount $\Psi'$ calculated by this expression is sent to the rotor position/current phase estimating unit 28. In the rotor position/current phase estimating unit 28, the corrected magnetic flux amount $\Psi'$ is used instead of the theoretical magnetic flux amount $\Psi$ in the data table based on Expressions 2 and 3 and used for detection of the rotor position $\theta m$.

Figure 8:
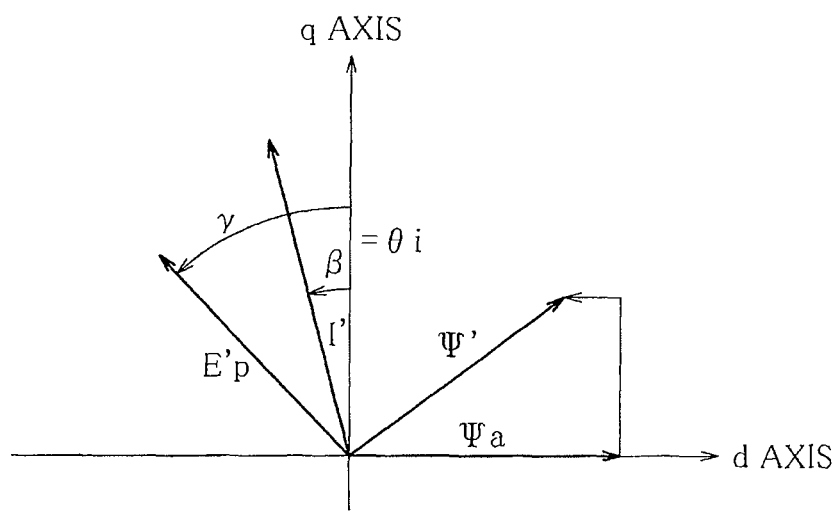
FIG. 8 is a motor vector diagram representing an estimated induced voltage peak value Ep' estimated from a motor parameter in the case of FIG. 7.

FIG. 8 shows a motor vector chart representing the estimated induced voltage peak value Ep' estimated from the motor parameters ($\Psi$, Ld, Lq, R, and $\omega$), which are machine constants peculiar to the motor.

Figure 9:
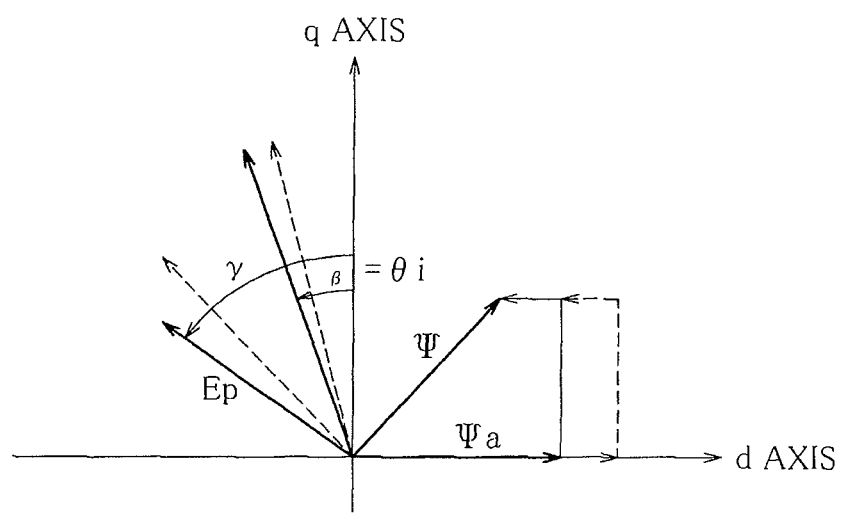
FIG. 9 is a motor vector diagram representing an induced voltage peak value Ep, which is an actual value, in the case in which a magnetic flux amount $\Psi$ decreases compared with the case of FIG. 8.

FIG. 9 shows a motor vector chart representing the induced voltage peak value Ep, which is an actual value, in the case in which the magnetic flux amount $\Psi$ decreases compared with the case of FIG. 8. Note that, in FIG. 9, vectors in the case of FIG. 8 are indicated by dotted lines.

When FIGS. 8 and 9 are compared, according to a decrease in the magnetic flux amount $\Psi$, both of the induced voltage electric angle $\theta e$ equivalent to the induced voltage phase $\gamma$ and the phase current electric angle $\theta i$ equivalent to the current phase $\beta$ increase. The data table prepared in the rotor position/current phase estimating unit 28 in advance defines the current phase $\beta$ using [phase current peak value Ip] and [induced voltage electric angle $\theta e$–phase current electric angle $\theta i$] as parameters. An expected current phase $\beta$ is selected using [phase current peak value Ip] and [induced voltage electric angle $\theta e$–phase current electric angle $\theta i$] as parameters. Therefore, it is evident that the current phase $\beta$ also changes according to [induced voltage electric angle $\theta e$–phase current electric angle $\theta i$].

Therefore, the motor parameter correcting unit 30 in this embodiment corrects not only the magnetic flux amount $\Psi$ but also the current phase $\beta$, i.e., the phase current electric angle $\theta i$ (the current phase $\theta i$) using $\Delta Ep$ calculated by the above expression.

More specifically, the following expression holds from the above expression:

$$Ep/(\omega\cdot\Psi)=Ep'/(\omega\cdot\Psi')$$

When this expression is transformed, the following expression holds:

$$\Psi=(Ep/Ep')\cdot\Psi'$$

When a difference between the theoretical value $\Psi$ and the actual value $\Psi'$ after correction is calculated using this expression, the following expression holds:

$$\Psi-\Psi'=(Ep/Ep')\cdot\Psi'-\Psi'=((Ep-Ep')/Ep')\cdot\Psi'$$

When this expression is further transformed, the following expression holds:

$$(\Psi-\Psi')/\Psi'=(Ep-Ep')/Ep'$$

It is seen from this expression that the magnetic flux amount $\Psi$ has a change ratio Rc equal to that of the induced voltage peak value Ep.

Further, when a magnetic flux amount change ratio is substituted as $\Delta\Psi$ and an induced voltage peak value change ratio is substituted as $\Delta E$ in this expression, the following expression holds:

$$(\Psi-\Psi')/\Psi'=\Delta\Psi=(Ep-Ep')/Ep'=\Delta E=Rc$$

Then, the motor parameter correcting unit 30 detects a current phase change ratio Rci of the phase current electric angle $\theta i$ with respect to the magnetic flux amount change ratio $\Delta\Psi$ according to a data table.

The data table used here defines a current phase change ratio $\Delta\theta i$, which is the change ratio Rci, of the current phase $\theta i$ using [phase current peak value Ip] and [phase current electric angle $\theta i$] as parameters. An expected current phase change ratio $\Delta\theta i$ can be selected using [phase current peak value Ip] and [phase current electric angle $\theta i$] as parameters.

Specifically, the change ratio Rci is calculated from the following function expression:

$$Rci=f(Ip, \theta i)$$

A data table including a result of the calculation as data is prepared in the motor parameter correcting unit 30 in advance.

The current phase change ratio $\Delta\theta i$ at the time when magnetic flux amount $\Psi$ changes at the change ratio Rc is calculated by the following expression:

$$\Delta\theta i=Rc\cdot\Delta E$$

A current phase $\theta i'$ after correction is calculated by the following expression:

$$\theta i'=\theta i+\Delta\theta i$$

Generation of the data table used in detecting the change ratio Rci, i.e., the current phase change ratio $\Delta\theta i$ in the motor parameter correcting unit 30 is performed on the premise that Expressions 2 and 3 hold under the motor vector chart of FIG. 6. The generation of the data table is performed by storing, while increasing stepwise the current phase $\beta$ and the electric current I, which are shown in the motor vector chart, respectively within predetermined ranges, the current phase $\beta$ at the time when [induced voltage phase $\gamma$–current phase $\beta$] is a predetermined value and generating a data table of the current phase $\beta$ in which [phase current peak value Ip] equivalent to [electric current I] and [induced voltage electric angle $\theta e$–phase current electric angle $\theta i$] equivalent to [induced voltage phase $\gamma$–current phase $\beta$] are parameters.

Figure 10:
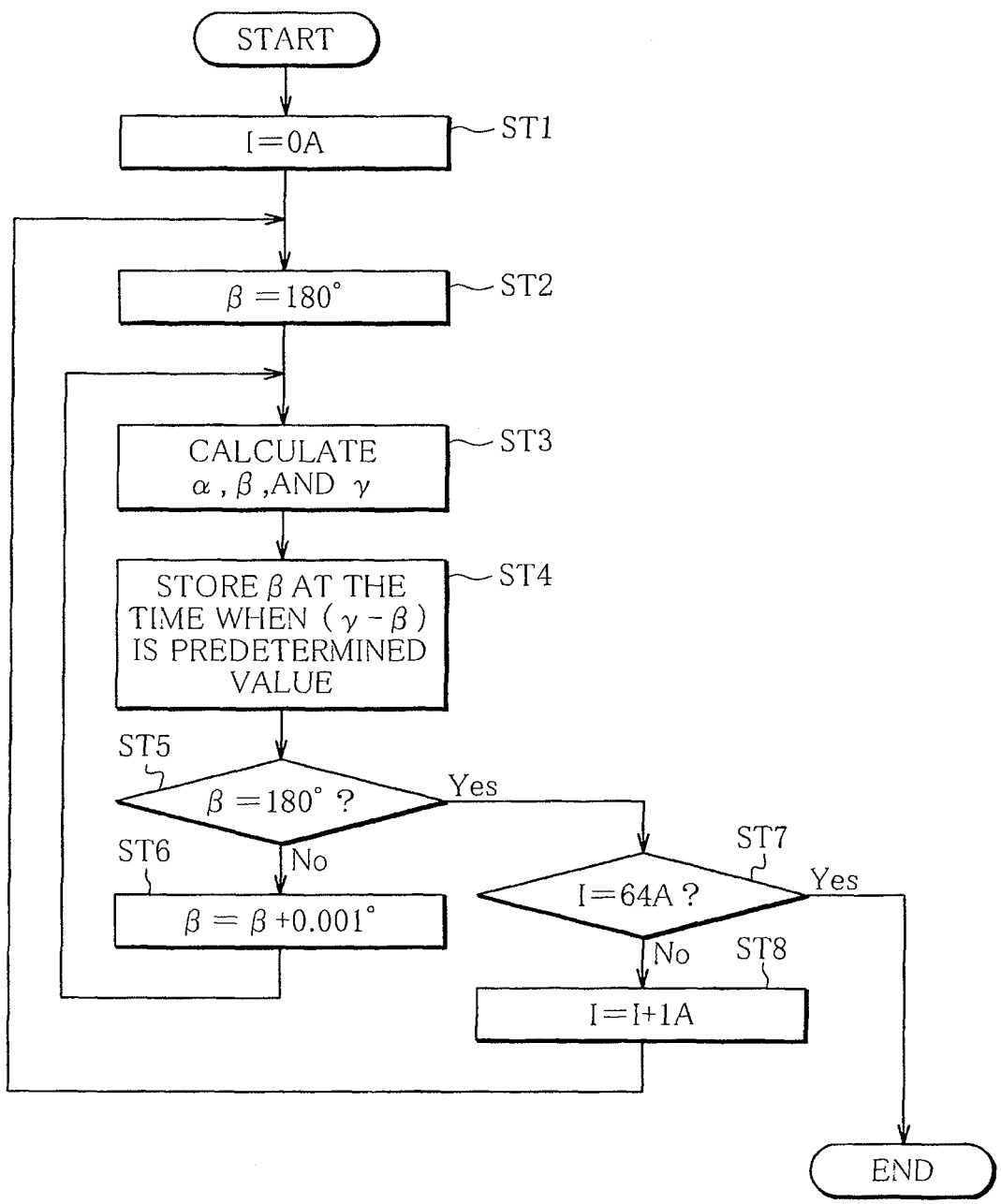
FIG. 10 is an explanatory diagram of a method of generating a data table used in correcting the motor parameter in a motor parameter correcting unit shown in FIG. 7.

More specifically, as shown in FIG. 10, while the current phase $\beta$ is increased from $-180°$ to $180°$ by $0.001°$ at a time and the electric current I is increased from 0 A to 64 by 1 A at a time (see steps ST1, ST2 and ST5 to ST8), the induced voltage E, the magnetic flux $\Psi$, and the voltage phase $\alpha$, the current phase $\beta$ and the induced voltage phase $\gamma$ are calculated from the motor vector chart using the motor parameter peculiar to the motor 1. Then, the current phase β at the time when a change ratio ΔΨ of [magnetic flux Ψ] is 1%, 2%, 3%, and the like is stored (see steps ST3 and ST4). Consequently, the data table of the current phase β is generated in which [phase current peak value Ip] equivalent to [electric current I] is one parameter and [induced voltage electric angle θe−phase current electric angle θi] equivalent to [induced voltage phase γ−current phase β] is another parameter.

As explained above, in this embodiment, as in the case of the first embodiment, it is possible to eliminate an error between a theoretical value and an actual value of the motor parameter and avoid a sensorless uncontrollable state involved in occurrence of the error. Therefore, it is possible to improve stability of the sensorless control for the motor 1. The motor parameter to be corrected is the magnetic flux amount Ψ of the permanent magnet. Consequently, since the permanent magnet is formed of ferrite or neodymium in general, the magnetic flux amount Ψ tends to be affected by a temperature change to which the motor 1 is exposed, and an error of the magnetic flux amount Ψ also tends to be large, it is possible to effectively improve stability of the sensorless control through elimination of the error.

Next, a third embodiment of the present invention is explained.

In this embodiment, a method of weighting and correcting the magnetic flux amount Ψ and the winding resistance R according to an operation state of a motor is adopted.

More specifically, when the motor is operated at low speed and high torque, since a relational expression ωΨ<RI holds, the influence of an error of the winding resistance R is large. Therefore, correction of the winding resistance R is prioritized. On the other hand, when the motor is operated at high speed and low torque, since a relational expression ωΨ>RI holds, the influence of an error of the magnetic flux amount Ψ is large. Therefore, correction of the magnetic flux amount Ψ is prioritized by correcting the induced voltage E.

Figure 11:
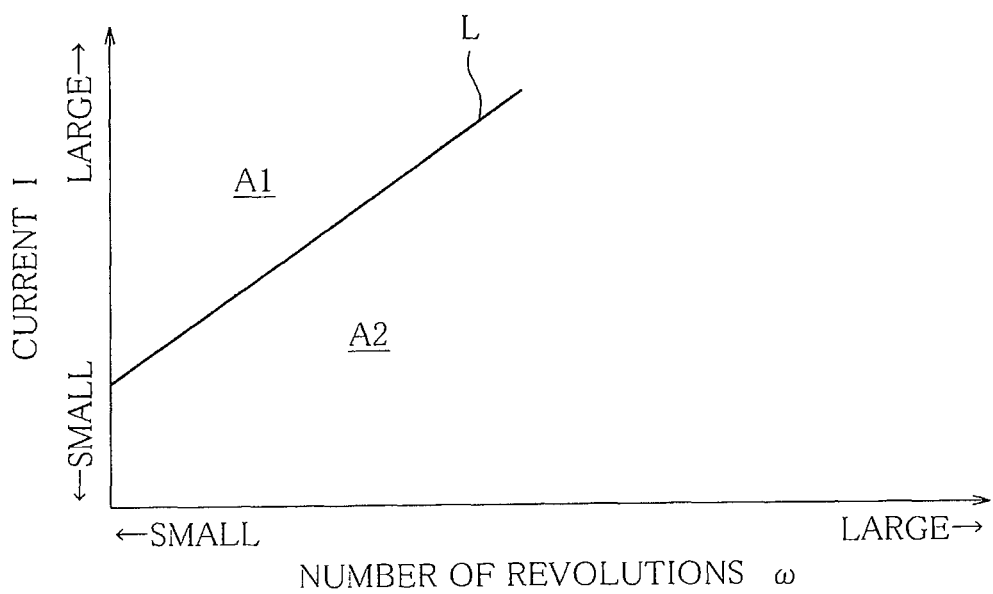
FIG. 11 is a diagram showing a map prepared in a motor parameter correcting unit according to a third embodiment of the present invention.

More specifically, a map in which an operation area A1 for correcting only the magnetic flux amount Ψ and an operation area A2 for correcting only the induced voltage E are divided and provided on a coordinate of the electric current I with respect to the number of revolutions ω of the motor 1 shown in FIG. 11 is prepared in the motor parameter correcting unit 30 in advance. A correction target is selected by determining in which of the areas A1 and A2 an operation state of the motor 1 is present. When the operation state of the motor 1 is present in the area A1, only the magnetic flux amount Ψ is corrected. When the operation state of the motor 1 is present in the area A2, only the induced voltage E, i.e., the magnetic flux amount Ψ is corrected.

When the operation state of the motor 1 is present on a boundary line L between the areas A1 and A2, a ratio of a correction amount of the magnetic flux amount Ψ and a correction amount of the winding resistance R is calculated by an approximate calculation such as interpolation processing. The motor 1 is optimally controlled according to weighted parameter correction.

As a specific method of weighting, a degree of the influence of the correction amount is calculated as a fluctuation range of a voltage and the correction amount is calculated by using the fluctuation range as a parameter of weighting.

More specifically, when a voltage fluctuating with respect to a change in the winding resistance R is represented as Vr, a voltage fluctuating with respect to a change in the induced voltage E is represented as Ve, a total voltage change amount is represented as ΔEp, a winding resistance-corrected voltage rate is represented as Vr-rate, and an induced voltage-corrected voltage rate is represented as Ve-rate, the following expressions hold:

$$Vr\text{-rate}=Vr/(Vr+Ve)$$

$$Ve\text{-rate}=Ve/(Vr+Ve)$$

When change amounts of a winding resistance correction voltage ΔEr and an induced voltage correction voltage ΔEe are calculated using these expressions, the following expressions hold:

$$\Delta Er=\Delta Ep\cdot Vr\text{-rate}$$

$$\Delta Ee=\Delta Ep\cdot Ve\text{-rate}$$

Further, from these expressions, when a winding resistance correction amount is represented as ΔR and an induced voltage correction amount is represented as ΔE, the following expressions hold:

$$\Delta R=\Delta Er/Ip$$

$$\Delta E=\Delta Er/Ep$$

Correction amounts of the motor parameters are calculated.

As explained above, in this embodiment, the motor parameter correcting means corrects the parameter according to an operation state of the motor. More specifically, the motor parameter correcting means corrects the parameter on the basis of a current phase detected by the rotor position detecting means and the number of revolutions detected by the revolution number detecting means as the operation state of the motor. Consequently, it is possible to change a correction amount of the parameter that changes according to the operation state of the motor. Therefore, it is possible to further improve accuracy of the sensorless control and further improve stability of the sensorless control.

Next, a fourth embodiment of the present invention is explained.

Figure 12:
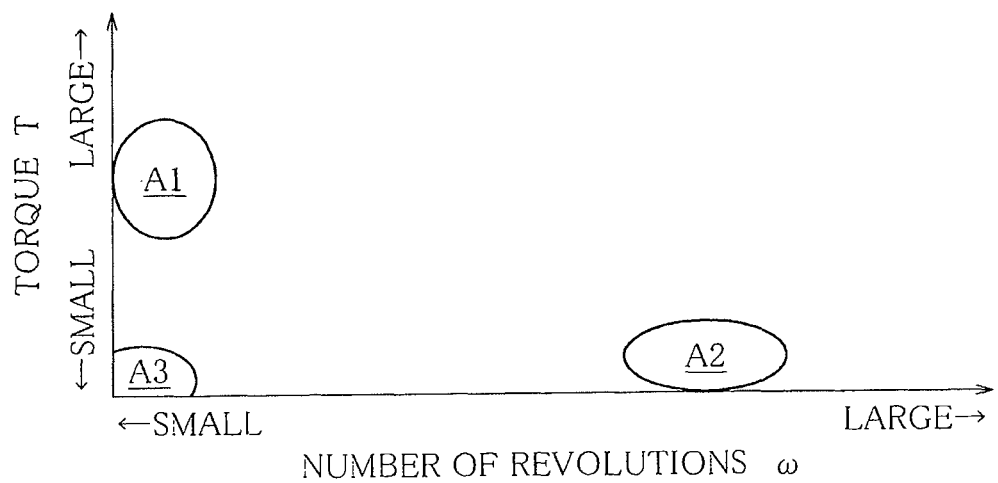
FIG. 12 is a diagram showing a map prepared in a motor parameter correcting unit according to a fourth embodiment of the present invention.

In this embodiment, a map in which operation areas A1 to A3 having different voltage errors of the motor 1 are divided and provided on a coordinate of the torque T with respect to the number of revolutions ω of the motor 1 shown in FIG. 12 is prepared in the motor parameter correcting unit 30 in advance. A correction target is selected by determining in which of the areas A1 to A3 an operation state of the motor 1 is present.

When the operation state of the motor 1 is present in the area A1, since the number of revolutions ω is nearly zero, an error of the induced voltage E, i.e., the magnetic flux amount Ψ hardly occurs. Therefore, only an error of the winding resistance R is taken into account and a correction amount of the winding resistance R is calculated. On the other hand, when the operation state of the motor 1 is present in the area A2, since the torque T of the motor 1 is nearly zero and a phase current flowing through the coil of the motor 1 is also nearly zero, an error of the winding resistance R hardly occurs. Therefore, only an error of the induced voltage E is taken into account and a correction amount of the induced voltage E, i.e., the magnetic flux amount Ψ is calculated.

When the operation state of the motor 1 is present in an area between the areas A1 and A2, a ratio of a correction amount of the magnetic flux amount Ψ and a correction amount of the winding resistance R is calculated by an approximate calculation such as interpolation processing. The motor 1 is optimally controlled according to weighted parameter correction.

On the other hand, when the operation state of the motor 1 is present in the area A3, since the induced voltage E is nearly zero, a correction amount of an error of a voltage applied to the inverter 2 is calculated and corrected.

As explained above, in this embodiment, as in the case of the third embodiment, the parameter is corrected according to the operation state of the motor. Consequently, it is possible to change a correction amount of the parameter that changes according to the operation state of the motor. Therefore, it is possible to further improve accuracy of the sensorless control and further improve stability of the sensorless control.

Next, a fifth embodiment of the present invention is explained.

In this embodiment, for example, the d-axis current Id is increased and decreased during the operation of the motor 1. The motor parameters (R and Ψ) are corrected according to a change amount of the induced voltage peak value Ep involved in the increase and decrease of the d-axis current Id.

Figure 13:
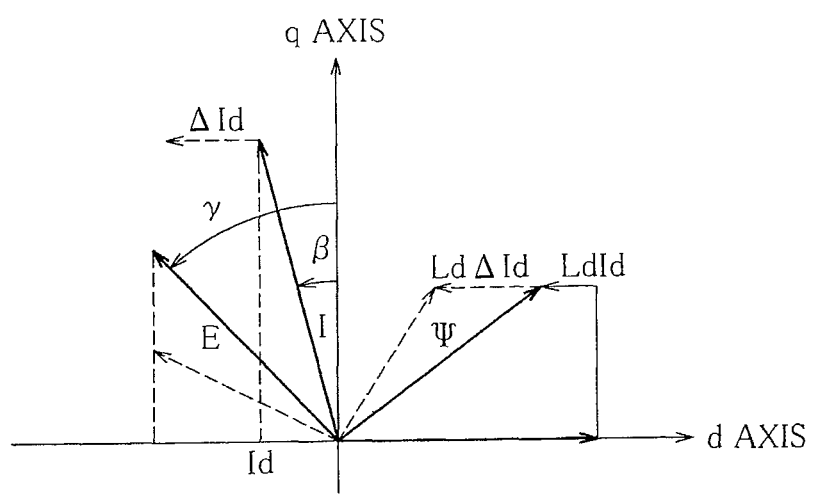
FIG. 13 is an explanatory diagram for explaining a decrease in the induced voltage peak value Ep in the case in which a d-axis current Id is increased in the motor parameter correcting unit according to the fourth embodiment of the present invention.

For example, as shown in FIG. 13, when a negative d-axis current Id is increased by 1A, the induced voltage peak value Ep decreases as shown in the figure. When a motor parameter fluctuates with an error, since a degree of a decrease in the induced voltage peak value Ep is different, a correction amount of the motor parameter is calculated using this characteristic.

As explained above, in this embodiment, the motor parameter correcting unit 30 changes an operation state of the motor to determine a correction amount of the parameter. Consequently, it is possible to spontaneously perform correction of the motor parameter. Therefore, it is possible to further improve accuracy of the sensorless control and further improve stability of the sensorless control.

The embodiments of the present invention are explained above. However, the present invention is not limited to the embodiments. Various modifications can be made without departing from the spirit of the present invention.

More specifically, the motor control device may include abnormality detecting means for determining that the motor 1 is abnormal and detecting the abnormality when the induced voltage difference deviates exceeding a predetermined range even when the parameter is corrected by the motor parameter correcting unit 30. Consequently, it is possible to quickly detect, as an abnormality of the motor 1, inability to eliminate the induced voltage difference even with the motor parameter correcting unit 30, stop an output of the motor 1, and improve reliability of the sensorless control of the motor 1.

In the embodiments, the three-phase brushless DC motor is illustrated as the motor 1 and the three-phase bipolar driving type inverter is explained as the inverter 2. However, the motor control device is not limited to this. Action and effects same as those explained above can be obtained by applying the present invention as long as the motor control device is a motor control device including an inverter for a synchronous motor for phases other than three phases.

If the motor control device according to the embodiments is applied to motor control for driving a compressor of an air conditioner for a vehicle or applied to motor control for driving an electric automobile, it is possible to suitably eliminate the disadvantages of the sensorless control explained above and improve controllability of the compressor and the electric automobile.

Reference Signs List
1 Permanent magnetic synchronous motor
10 Rotor position detecting unit (Rotor position detecting means)
12 Revolution number detecting unit (Revolution number detecting means)
22 Phase voltage setting unit (Phase voltage setting means)
30 Motor parameter correcting unit (Motor parameter correcting means)

The invention claimed is:

1. A motor control device that detects a rotor position of a permanent magnetic synchronous motor through sensorless control, the motor control device comprising:
current detecting means for detecting an electric current flowing through a coil of the motor;
applied voltage detecting means for detecting a voltage applied to the coil of the motor;
rotor position detecting means for detecting a current phase and a current peak value, and an induced voltage phase and an induced voltage peak value on the basis of the electric current detected by the current detecting means and the voltage detected by the applied voltage detecting means, and detecting the rotor position and detecting an estimated induced voltage peak value on the basis of the detected current phase and the detected current peak value, and the detected induced voltage phase, and a parameter, which is a machine constant of the motor;
revolution number detecting means for detecting a number of revolutions of the motor on the basis of the rotor position detected by the rotor position detecting means; and
phase voltage setting means for setting a target voltage on the basis of the electric current detected by the current detecting means and the rotor position detected by the rotor position detecting means, wherein
the rotor position detecting means includes motor parameter correcting means for correcting the parameter in order to eliminate an induced voltage difference between the detected induced voltage peak value and the detected estimated induced voltage peak value and detects the rotor position on the basis of the corrected parameter.

2. The motor control device according to claim 1, wherein the parameter is winding resistance of the coil.

3. The motor control device according to claim 1, wherein the parameter is a magnetic flux amount of a permanent magnet of the motor.

4. The motor control device according to any of claim 1, wherein the motor parameter correcting means corrects the parameter according to an operation state of the motor.

5. The motor control device according to claim 4, wherein the motor parameter correcting means corrects the parameter on the basis of the current phase detected by the rotor position detecting means and the number of revolutions detected by the revolution number detecting means as an operation state of the motor.

6. The motor control device according to any of claim 1, wherein the motor parameter correcting means changes an operation state of the motor to determine a correction amount of the parameter.

7. The motor control device according to any of claim 1, wherein the motor control device comprises abnormality detecting means for determining that the motor is abnormal and detecting the abnormality when the induced voltage difference deviates exceeding a predetermined range even when the parameter is corrected by the motor parameter correcting means.

* * * * *